July 31, 1962     R. Y. SALE     3,046,755
ICE CREAM FREEZER

Filed Jan. 26, 1961     2 Sheets-Sheet 1

Roberson Y. Sale
INVENTOR.

July 31, 1962  R. Y. SALE  3,046,755
ICE CREAM FREEZER
Filed Jan. 26, 1961
2 Sheets-Sheet 2
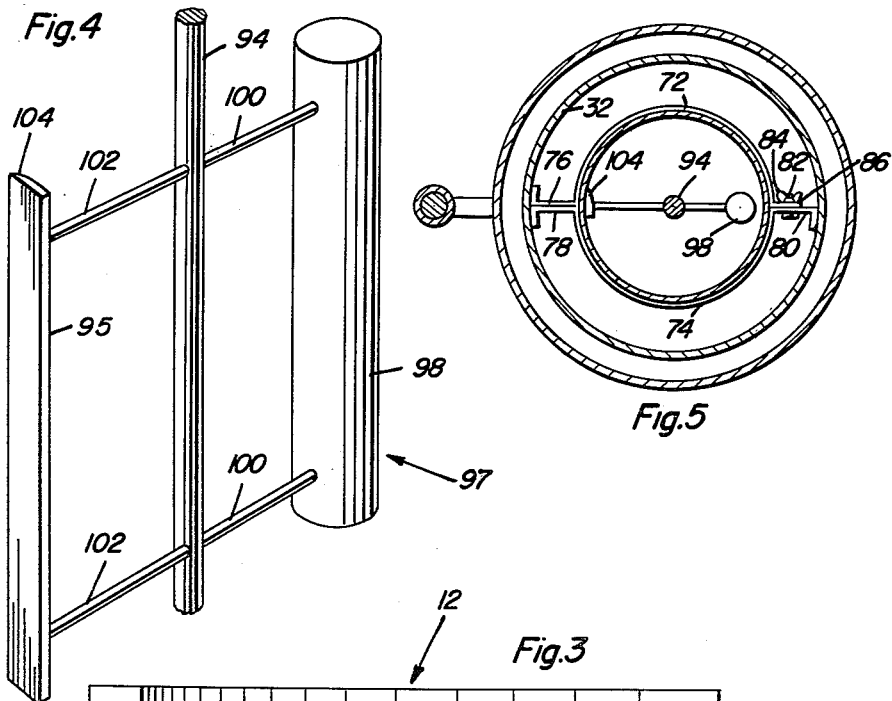
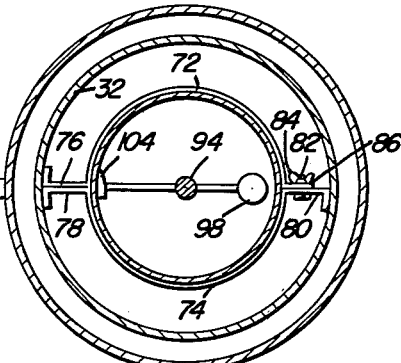
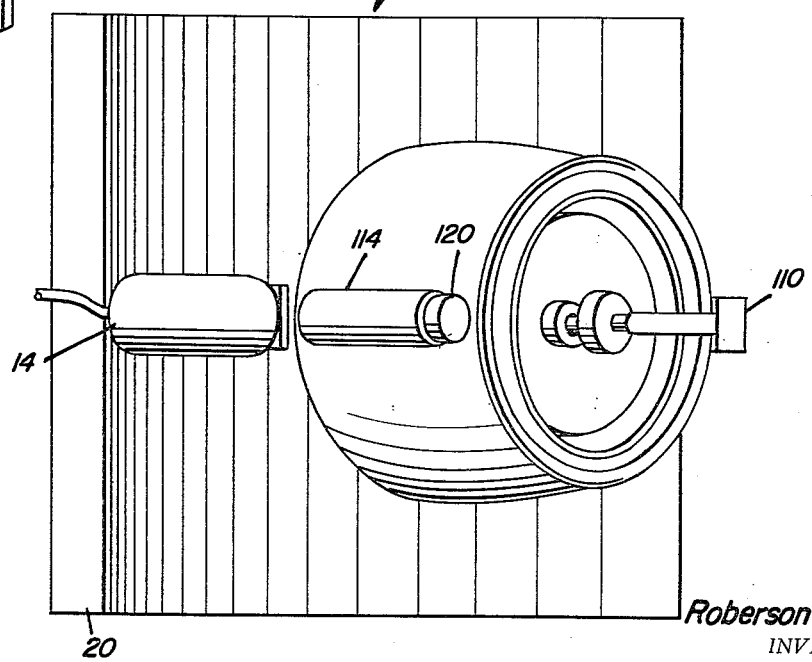
Roberson Y. Sale
INVENTOR.

United States Patent Office 3,046,755
Patented July 31, 1962

3,046,755
ICE CREAM FREEZER
Roberson Y. Sale, 2345 Frisse Ave., Evansville, Ind.
Filed Jan. 26, 1961, Ser. No. 85,084
5 Claims. (Cl. 62—136)

This invention relates to freezer devices, and more particularly to a particular design for an ice cream freezer.

Briefly, the invention comprises a base having an ice cream container concentrically fixed within an ice container, and both of the containers being rotatably mounted on the base. A conventional electric drill is removably mounted on the base for driving the containers. A dasher is mounted within the ice cream container and is normally prevented from rotation by a counterbalance weight. However, once ice cream becomes properly frozen, due to increasing viscosity of the ice cream, the force of the counterweight is overcome and the dasher and weight rotate with the ice cream container so as to prevent overload and damage to the drill motor.

Accordingly, it is an object of this invention to provide an ice cream freezer which may be operated by conventional electric drill such as found in the average American home. This results in substantial savings since it eliminates the need for a separate electric motor made specifically for the freezer.

It is another object of this invention to provide an ice cream freezer having automatic overload release means thereon so as to prevent operation of the freezer once the ice cream has reached a predetermined viscosity and thereby preventing overload and damage to the electric driving motor.

It is another of this invention to provide an ice cream freezer having means therein for effectively using water resulting from the melting of the ice used in the freezer.

It is another object of this invention to provide an ice cream freezer which may alternatively be powered by an electric or manual means.

Another object of the invention is to provide an ice cream freezer which is simple in construction, economical to manufacture and maintain, and is durable and reliable in use.

Figure 1:
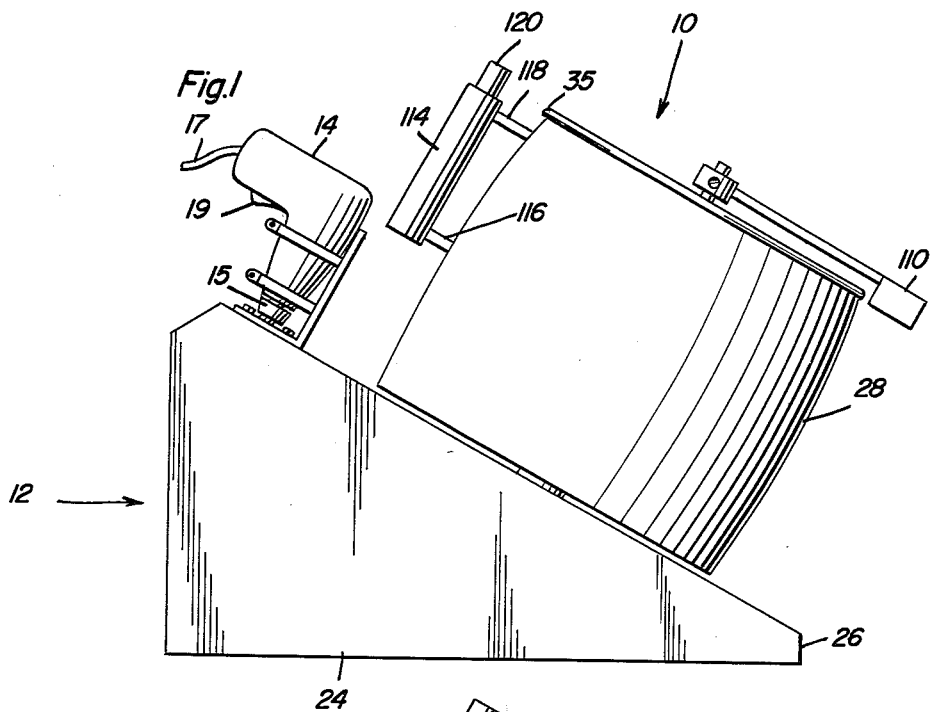
Figure 2:
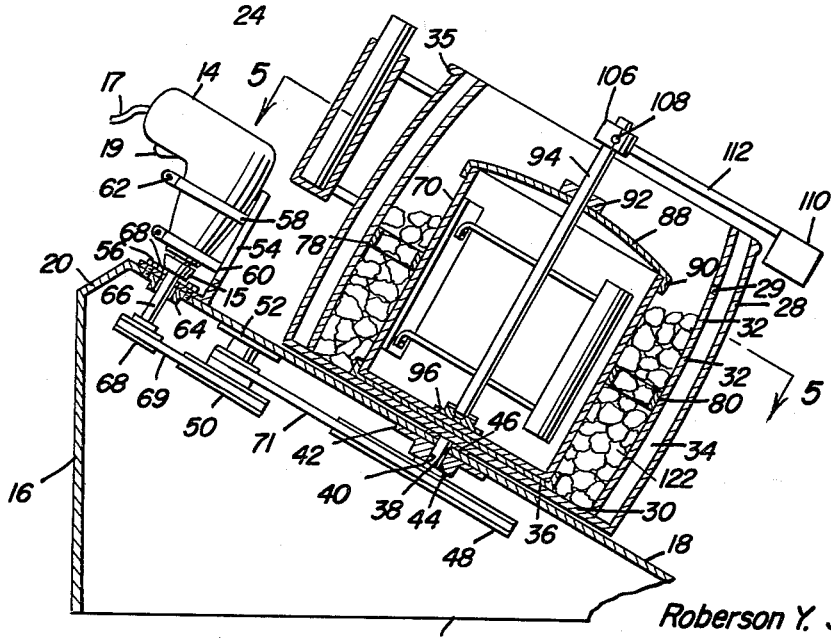

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the invention;
FIGURE 2 is a view similar to FIGURE 1 but shows an elevational cross-sectional view through the invention;
FIGURE 3 is a plan view of the invention;
FIGURE 4 is an enlarged perspective view of the dasher; and
FIGURE 5 is a cross sectional view taken substantially on the plane of line 5—5 of FIGURE 2.

The invention comprises a freezer assembly 10 mounted on a base 12 which also supports a conventional electric drill 14 for driving the freezer.

The base 12 is substantially triangular in cross section and comprises a vertical back wall 16, a sloping front wall 18, a supporting vertical flange 26 for the front wall, a top wall 20 and two parallel end walls 22 and 24. All of the walls are integrally formed together or alternatively, are rigidly secured together to form one rigid base member.

The freezer 10 comprises an outer cylindrical container 28 having an open top and a circular bottom 30 secured to the cylindrical wall thereof. Also, fixed to the bottom 30 is an inner cylinder 32 concentrically mounted within the container 28 and spaced from the walls thereof so as to form an annular air containing insulating chamber 34.

Fixed to the bottom wall 30 and concentrically mounted within the cylinder 32 is a circular bearing plate 36 having an annular flange on its periphery.

The front wall 18 of the base has an aperture 38 therein which is of the same size as and aligned with an aperture 40 in a bearing plate 42 which is fixed to the undersurface of the wall 18. A spindle 44 is fixed to the bottom of the freezer container 28 in alignment with its longitudinal axis and is rotatably journalled in the apertures 40 and 38. The spindle also extends through an annular thrust bearing 46 which rotatably supports the container 28, and the lower end of the spindle has a pulley 48 secured thereto by releasable means such as a setscrew (not shown).

Also fixed to the underside of the wall 18 is a double idler pulley 50. The pulley 50 has two annular belt receiving grooves therein and is rotatably mounted on a base 52 which is secured to the wall 18.

Mounted on the upper central portion of the wall 18 is an L-shaped support 54 for a drill 14. The support 54 is removably secured to the base 12 by means of bolts 56 extending through apertures in the L-shaped support and threaded into the base 12. The support 54 also has fixed thereto two resilient C-clamps 58 and 60 which have screws with nuts 62 extending through the adjacent open ends thereof for releasably tightening the clamps about the body of the drill.

Rotatably mounted in the bearing 64 which is secured to the underside of wall 18 and in an aperture in the bottom of the drill support is a drive shaft 66 which has an upper flange 68 secured thereto for preventing the shaft from dropping downwardly into the base. Removably secured to the lower end of the shaft 66 is a drive pulley 68.

Concentrically mounted within the freezer container 28 is an ice cream container 70 which is concentrically supported within the freezer by means of the flange support plate 36. As more clearly shown in FIGURE 5, the ice cream container 70 is releasably secured to the inner cylinder 32 by means of two semi-circular members 72 and 74 which are each secured by the integral L-shaped extensions 76 and 78 to the inside wall of the cylinder. The L-shaped extensions 76 and 78 may be connected to the cylinder 32 by conventional means such as spot welds. The opposite end of the clamp 74 has an L-shaped extension 80 thereon secured to the opposite side of the cylinder 32. Adjacent the L-shaped extension 80 is a radial flange having an aperture therein. The L-shaped extension 80 also has an aperture therein in alignment with the aperture in the flange 86. Semi-circular clamp 72 is quite resilient and may be pulled away from the clamp 74 so as to insert container 70 therein. The container 70 is secured to the inner cylinder 32 by means of the clamps by inserting the bolt 82 through the apertures in the clamps and drawing the flange 86 towards the extension 80 by means of the winged nut 84.

The container 70 has a dome-shaped top 88 thereon which is secured to the container by means of the annular flange 90 which has a friction fit around the upper edge thereof.

The dome top 88 has an aperture therein which is aligned with an aperture in the bearing member 92 fixed to the top. The aperture in bearing 92 rotatably supports a dasher shaft 94 which is further supported at its lower end by means of a thrust bearing 96 affixed to the bottom of the ice cream container 70.

As shown in FIGURES 2 and 4, the dasher shaft 94 has a dasher blade 95 and a counterweight 98 affixed thereto by radial parallel arms 100 and 102. The counterweight 98 is preferably composed of some dense material such as lead or stainless steel. The dasher 95 is preferably composed of wood and has a pointed edge 104 which scrapes the ice cream from the inside wall of the ice cream container 70 as it rotates relative thereto.

Also fixed to the upper end of the dasher shaft 94 by means of a sleeve 106 and setscrew 108 is a second counterweight 110 which is fixed to the sleeve by means of radial arm 112.

Fixed to an outer upper portion of the container 28 is a handle assembly comprising a hollow cup-shaped member 114 secured to container 28 by means of parallel arms 116 and 118. Slidably mounted within the cup-shaped member 114 is an extensible handle member 120 of cylindrical shape.

In operation, a conventional electric drill 14 is secured to the L-shaped support by means of the adjustable C-clamps 58 and 60. The chuck 50 of the drill is inserted over the shaft 66 and tightened thereupon. The cord 17 of the drill is connected to a conventional 110-volt house outlet. Ice cream mix is inserted into the container 70, after which the dasher assembly 97 is inserted into the container 70 and retained therein by top 88 and bearing 96 as shown in FIGURE 2. The container 28 is then partially filled with crushed ice and salt 122.

To start the operation of the freezer, the trigger switch 19 is depressed which energizes the motor of the electric drill 14. The drill rotates the container 28 by means of shaft 66, pulley 68, V-belt 69, double pulley 50, V-belt 70, pulley 48, and shaft 44. As the container 28 rotates, it also rotates the ice cream container 70 by means of the C-clamps 74 and 72 and the container 70 further rotates the ice cream mixed therein. However, since the shaft 94 is mounted at approximately 65 degree angle, the dasher assembly is prevented from rotation by the dangling counterweights 98 and 110. Although the counterweights 110 and 98 normally prevent rotation of the dasher assembly 97, once the ice cream becomes properly frozen, the viscosity thereof reaches a point where sufficient torque is transmitted from the ice cream container through the ice cream to the dasher assembly thereby overcoming the stabilizing force of weights 98 and 110. When this occurs, the dasher assembly and the weights as well as the ice cream all rotate as one unit with the containers 28 and 70. This prevents the motor of the electric drill from becoming overloaded and thereby being damaged. Also, rotation of the weight 110 and arm 112 indicates to the operator of the freezer that the ice cream is properly frozen and therefore in condition to be removed from the freezer and consumed.

The annular space 34 which is formed between the walls 32 and 28 is connected to the interior of the inner cylinder by means of one or more passageways 29 in the upper portion of inner cylinder 32. As the ice 122 melts, the water resulting therefrom flows through passage 29 and into chamber 34. This cold water in chamber 34 acts as an effective insulator and cooling means for the ice 122.

Formed on the upper edge of the cylindrical container 28 is an annular lip 35 which permits effective pourings of liquid from the chamber 34 and 32. These chambers may be emptied by grasping handle portion 114 and tilting the entire device.

When no power means are available for the freezer, such as when it is being used on picnics, then the freezer may be operated manually by means of the handle member 120. To operate the mechanism manually, the cylindrical member 120 is partially withdrawn from cup 114 and then rotated around the axis of shaft 94. Arm 118 is of sufficient length to prevent any contact between the weight 110 and the handle assembly. The handle assembly is also located substantially over the center of gravity of the entire freezer mechanism. By grasping the cup 114, the entire freezer assembly may be lifted and easily transported. The handle also forms a convenient means for tilting the freezer for pouring out the used ice and water therein.

In operation, the V-belts 69 and 71 in conjunction with the pulleys 68, 50 and 48, reduce the speed of the drive shaft 66 so as to rotate the dasher shaft 94 approximately 50 r.p.m.

If for any reason, the crushed ice 122 should become jammed or wedged between the ice cream container 70 and the inner cylinder 32, the container and cylinder will then rotate as usual thereby preventing damage to the motor of drill 14 and will not affect the freezing of cream or the dasher in any way.

During operation of the machine, the dasher blade 95 functions to stir the ice cream and scrape the frozen cream from the inside walls of container 70 by means of the sharpened edge 104.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A freezer for freezing ice cream comprising a base, an ice cream container rotatable on the base in a bath of cooling medium, a dasher rotatably mounted within the container, means for rotating the container drivingly connected thereto, an overload release means connected to the dasher and preventing rotation of the dasher when the viscosity of the ice cream is below a predetermined value, said overload release means automatically permitting continuous rotation of said dasher with said container when the ice cream reaches said predetermined viscosity.

2. A freezer for ice cream comprising a base, an ice cream container structure rotatably mounted on the base, a dasher structure rotatably mounted within the container structure for stirring the ice cream, means for rotating one of said structures, an overload release means preventing rotation of the other structure when the viscosity of the ice cream is below a predetermined value, said overload release means automatically permitting continuous rotation of said other structure with said one structure when the viscosity of the ice cream reaches said predetermined value, the axis of rotation of said structures being inclined and said overload release means comprising at least one counterweight offset from said axis and fixed to said other structure.

3. A device as defined in claim 2 wherein said ice cream container structure is mounted within and fixed to a container for a cooling medium, the latter container comprising inner and outer walls spaced to form an insulating chamber therebetween, inlet passage means through the inner wall for said cooling medium to flow into the insulating chamber, exhaust passage means above said inlet passage means communicating with said chamber.

4. A device as defined in claim 2 wherein the means for rotating the container comprises a conventional electric drill.

5. A freezer as recited in claim 2 wherein two of said counterweights are connected to the dasher structure, one of said weights being within the container structure and the other being removably mounted on the dasher structure axis above the freezer and said one weight.

References Cited in the file of this patent

UNITED STATES PATENTS

| 1,988,214 | Page | Jan. 15, 1935 |
| 2,194,719 | Parrish | Mar. 26, 1940 |
| 2,233,975 | Epperson | Mar. 4, 1941 |
| 2,541,814 | Gaddini | Feb. 13, 1951 |

FOREIGN PATENTS

| 8,828 | Great Britain | July 6, 1886 |